United States Patent [19]

Powell, Sr.

[11] Patent Number: 4,583,465
[45] Date of Patent: Apr. 22, 1986

[54] RAILWAY WHEEL APPARATUS FOR A ROAD VEHICLE

[76] Inventor: Parks L. Powell, Sr., 660 Bankhead Hwy., Mableton, Ga. 30059

[21] Appl. No.: 665,761

[22] Filed: Oct. 29, 1984

[51] Int. Cl.⁴ ............... B61D 15/00; B61F 13/00
[52] U.S. Cl. ..................... 105/215 C; 105/215 R
[58] Field of Search ............... 105/215 C, 215 R; 403/378, 379; 104/245; 180/209, 906; 280/43.23, 112 A

[56] References Cited

U.S. PATENT DOCUMENTS

| | | | |
|---|---|---|---|
| 1,501,744 | 7/1924 | Brilhart | 105/215 R |
| 2,116,525 | 5/1938 | Luce | 105/215 C |
| 2,583,072 | 1/1952 | Wilson | 403/379 |
| 2,896,548 | 7/1959 | Obes | 105/215 R |
| 3,704,027 | 11/1972 | Laudadio | 280/112 A |
| 3,804,025 | 4/1974 | Elliott | 105/215 C |
| 3,808,693 | 5/1974 | Plasser et al. | 105/215 R |
| 4,077,328 | 3/1978 | Taylor | 105/275 |
| 4,488,494 | 12/1984 | Powell, Sr. | 105/215 R |

FOREIGN PATENT DOCUMENTS

W 10970 12/1955 Fed. Rep. of Germany ... 105/215 R

Primary Examiner—Robert B. Reeves
Assistant Examiner—Dennis C. Rodgers
Attorney, Agent, or Firm—Rodgers & Rodgers

[57] ABSTRACT

For mounting to the frame of a road vehicle, a railway wheel apparatus comprises an axle, a pair of flanged wheels mounted in spaced relation on the axle, a first pair of laterally spaced toggle structures pivotally connected at the lower ends thereof to the axle, a second pair of spaced toggle structures pivotally connected at one end thereof respectively to the upper ends of the first pair of toggle structures and pivotally connected at the other ends thereof to the frame, so that extension of said toggle structures into substantial alignment with each other effects a downward lowering of the axle and wheels and so that bodily angular movement of the toggle structures effects upward raising of the axle and wheels, and a pair of fluid motors for extending and retracting the toggle structures respectively whereby the wheels are lowered and raised relative to the vehicle frame.

10 Claims, 8 Drawing Figures

RAILWAY WHEEL APPARATUS FOR A ROAD VEHICLE

TECHNICAL FIELD

This invention relates to apparatus for mounting at the rear of a road vehicle so as to adapt the vehicle for operation on railway tracks whereby flanged wheels and an associated axle are lowered and raised relative to the vehicle frame.

BACKGROUND ART

Known devices for adapting a road vehicle for use on railway tracks ordinarily contemplate the provsion of flanged wheels pivotally mounted on the vehicle frame and arranged to swing through an arc so as to raise or lower the flanged wheels as desired. Such prior art structures project outwardly from the vehicle frame and thus require additional space and are not well adapted for sidewise movement relative to the vehicle frame so as to accommodate minor misalignment between the road vehicle wheels and the railway tracks.

DISCLOSURE OF THE INVENTION

According to this invention in one form, flanged wheels and their associated axle are raised and lowered vertically relative to the vehicle frame instead of being moved through an arc. In addition the apparatus includes toggle structures which are arranged to swing in planes which are disposed in general alignment with and parallel to the axle on which the flanged railway wheels are mounted so that sidewise movement of the flanged wheels relative to the vehicle frame and to the railroad tracks is readily accomplished thus avoiding tedious alignment of the vehicle road wheels with the railway tracks. More specifically a pair of flanged wheels mounted in spaced relation on an axle are interconnected with a road vehicle frame by means of a first pair of spaced apart toggle structures which are pivotally connected at one end thereof to the axle together with a second pair of spaced apart toggle structures which are pivotally connected at one end thereof respectively to the other ends of the first pair of toggle structures and in turn are pivotally connected at their other ends to the vehicle frame whereby extension of said toggle structures into substantial alignment with each other effects downward lowering of the axle and wheels and angular movement of the toggle structures relative to each other effects retraction of such structures whereby the axle and wheels are raised and fluid motors for extending and retracting the toggle structures relative to each other.

BEST MODE OF CARRYING OUT THE INVENTION

Figure 1:
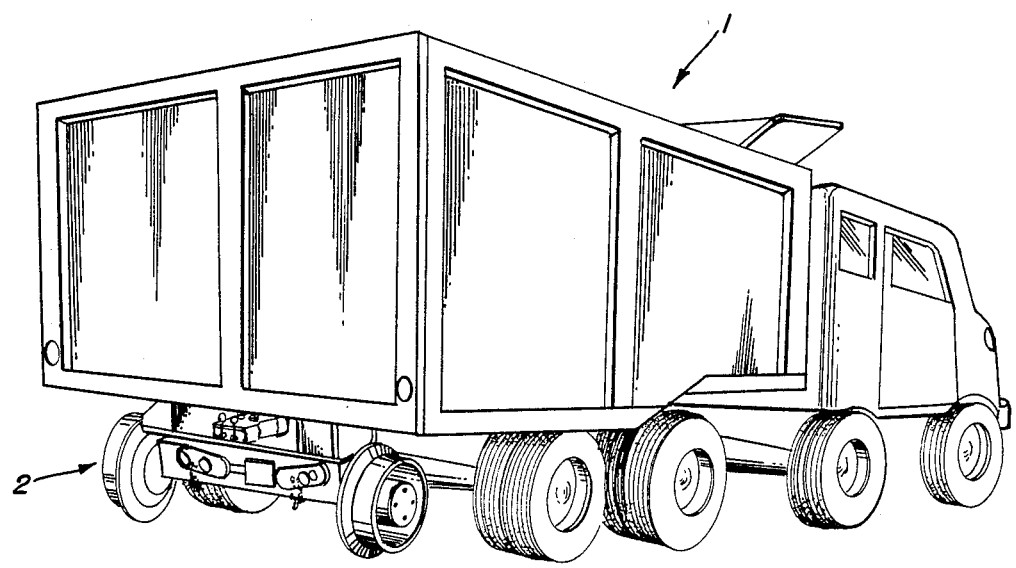
FIG. 1 is a perspective view of a road vehicle to the rear end of which a railway wheel apparatus constructed according to this invention is mounted.

In the drawings, the numeral 1 generally designates a truck on which railway wheel apparatus 2 formed according to this invention is mounted.

Figure 2:
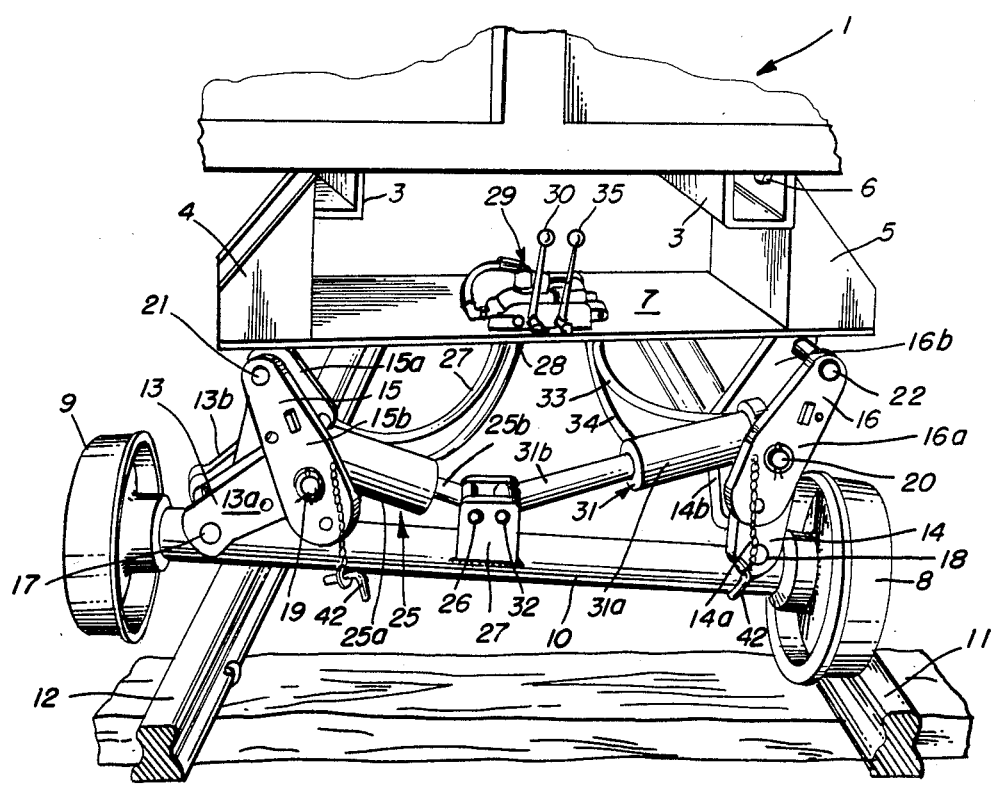
FIG. 2 is a view from the rear of apparatus formed according to this invention and which depicts the flanged wheels and their associated axle spaced to the left side of railway tracks.
Figure 3:
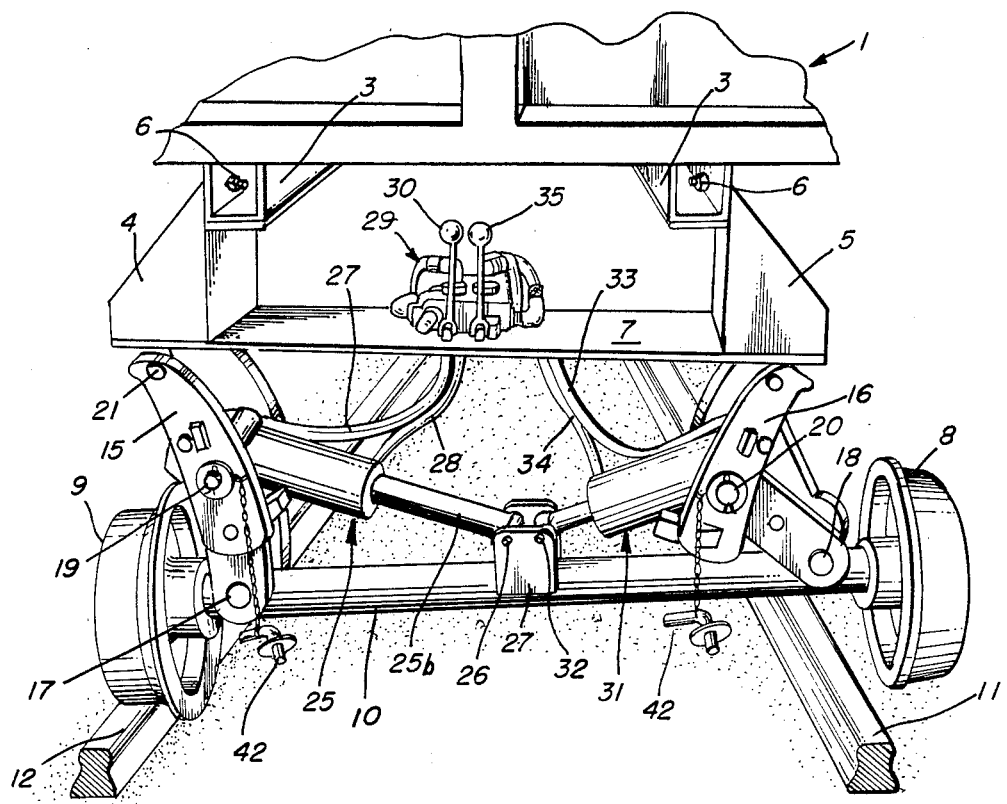
FIG. 3 is a view similar to FIG. 2 but which shows the flanged wheels and axles spaced to the right side of the railway tracks.
Figure 4:
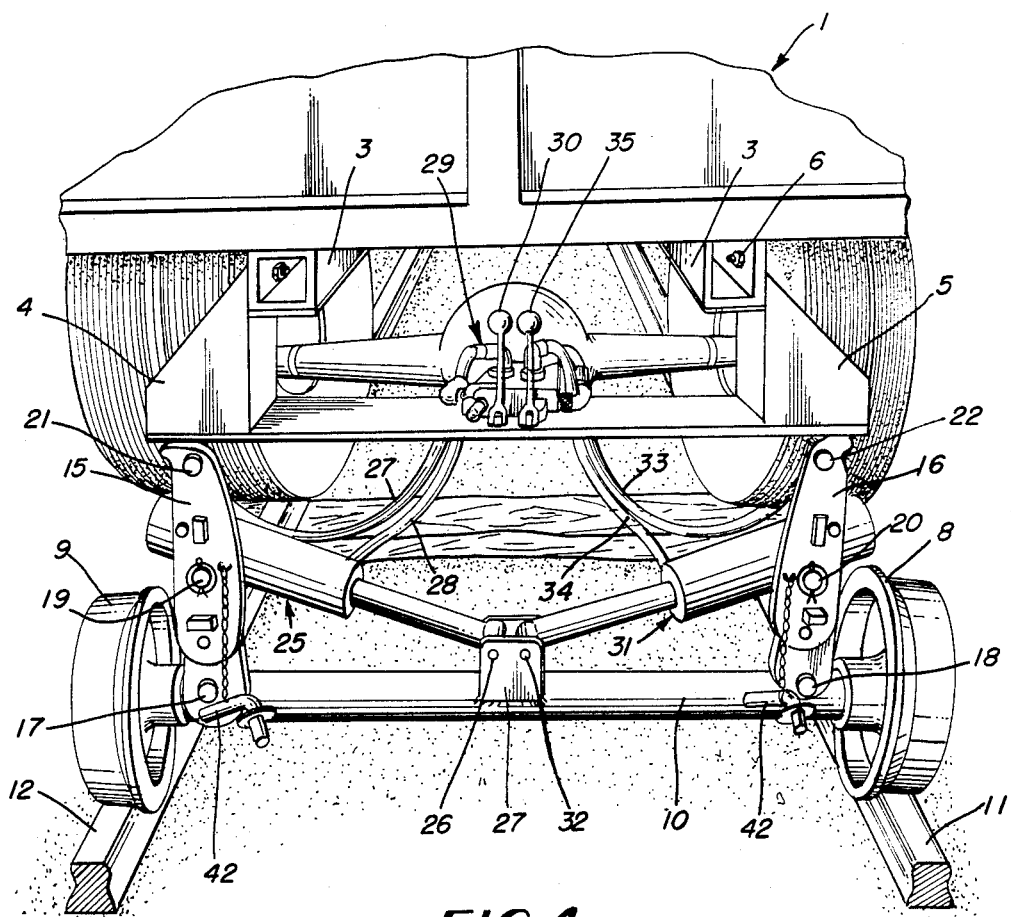
FIG. 4 shows the flanged wheels properly aligned with and mounted on the railway tracks.

In FIGS. 2, 3, and 4, the numeral 3 designates a part of the frame of vehicle 1. A pair of support elements 4 and 5 are secured as by suitable bolts 6 to the frame 3. A base plate 7 is bolted or otherwise secured to the lower portions of support elements 4 and 5.

Flanged wheels 8 and 9 are mounted on axle 10 and are adapted for cooperation with railway tracks 11 and 12. Axle 10 is interconnected with the frame 3 and support elements 4 and 5 as well as base plate 7 by means of a first pair of toggle links 13 and 14 together with a second pair of toggle links 15 and 16. Toggle link 13 is pivotally connected at 17 to axle 10 while toggle link 14 is pivotally connected at 18 to axle 10. Toggle structure 13 is pivotally connected with toggle structure 15 at pivot 19 to form one toggle while toggle structure 14 is pivotally connected to toggle structure 16 at pivot 20 to form another toggle. Toggle structure 15 is pivotally connected with the base plate 7 and support element 4 by pivot 21 while toggle structure 16 is pivotally connected with support element 5 and base plate 7 at pivot 22.

As is apparent particularly in FIGS. 2 and 3, toggle structure 13 comprises a pair of spaced coincidental toggle links 13a and 13b while toggle structure 15 comprises a pair of spaced coincidental toggle links 15a and 15b. In like fashion, toggle structure 14 includes a pair of spaced coincidental toggle links 14a and 14b while toggle structure 16 includes a pair of spaced coincidental toggle links 16a and 16b.

Figure 5:
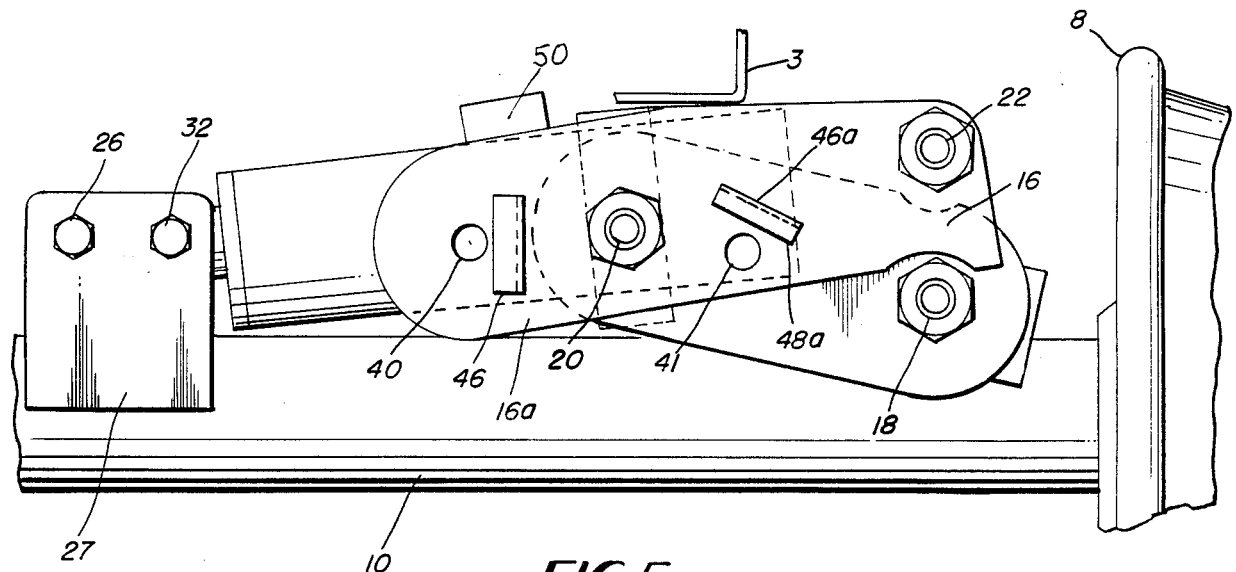
FIG. 5 depicts apparatus in its retracted position.

When the flanged wheels and axle are in their retracted or upper positions, the parts occupy the positions represented in FIGS. 1 and 5. When the apparatus is extended into its lower position the parts occupy the positions shown in FIGS. 4 and 6.

For the purpose of imparting operating movement to toggle structures 13 and 15, operating means in the form of a fluid motor generally designated at 25 is provided and includes a cylinder 25a and a piston not shown but having a piston rod 25b. The right hand end of piston rod 25b is pivotally connected at pivot 26 with a structure 27 secured by welding or otherwise to the axle 10 at approximately the mid point thereof. Cylinder 25a is partially between links 15a and 15b and between toggle links 13a and 13b and is pivotally connected thereto by pin 19 so that outward movement of piston rod 25b relative to cylinder 25a tends to swing toggle structure 15 in a clockwise direction about pivot 21 while such operating movement imparts swinging movement to toggle structure 13 in a counterclockwise direction about pivot 17 so that ultimately these structures 13 and 17 occupy the positions as shown in FIG. 4.

Operating movement is imparted to the fluid motor 25 from a source of fluid pressure not shown through a pair of flexible conduits 27 and 28. Flow through these conduits is controlled by conventional valve means generally designated at 29 and which includes a manually operated control lever 30. Thus in order to drive the piston rod 25b outwardly and toward the right as viewed in FIG. 2 relative to cylinder 25a, fluid pressure is supplied through conduit 27 to the left hand end of cylinder 25a and fluid is discharged from cylinder 25a through conduit 28 in conventional fashion due to appropriate operation of manual lever 30. If it is desired to retract piston rod 25 fluid is supplied to cylinder 25a through conduit 28 and is discharged from cylinder 25a through conduit 27 due to appropriate operation of manual lever 30.

In like fashion, a similar fluid motor 31 is associated with toggle structures 14 and 16 and includes a cylinder 31a and a piston not shown and an associated piston rod 31b. Piston rod 31b is pivotally connected at 32 to structure 27 and the cylinder 31a is pivotally connected at pivot 16a. Control of fluid motor 31 is by means of conduits 33 and 34 together with manually operable control lever 35.

With the railway wheel apparatus disposed in its uppermost position as represented by FIG. 5, the apparatus is lowered by supplying fluid pressure such as hydraulic liquid to the cylinders 25a and 31a through conduits 27 and 33 thereby to extend or straighten the toggle structures 13, 15 and 14, 16 so as to cause the parts to occupy the positions represented in FIG. 4 at which the flanged wheels 8 and 9 are in cooperative contact with the rails 11 and 12 respectively.

Since the toggle structure 13,15 and 14,16 operate in a plane parallel to an in general alignment with the axle 10, these structures do not protrude outwardly to any significant extent beyond the frame 3 of the vehicle 1 and parts associated therewith. Of course, this action of the cooperating parts imparts up and down vertical movement to the flanged wheels 8 and 9 and the associated axle 10 rather than causing movement of the wheels and axle through an arcuate path as is the practice with known structures.

According to another feature of this invention, it is not essential that the vehicle road wheels be precisely aligned with the railway tracks when the vehicle is positioned to allow the flanged wheels to move downwardly and into engagement with the railway tracks. This aspect of the invention is represented at FIGS. 2 and 3. In FIG. 2, the road vehicle wheels are not precisely aligned with the vehicle tracks 11 and 12 and lowering of the axle and flanged wheels 8 and 9 may be accompanied by sidewise movement of the axle and wheels simply by appropriate control of the manual levers 30 and 35. As shown for example in FIG. 2, the flanged wheels 8 and 9 are to the left of the railway tracks 11 and 12. In order to cause those wheels to move toward the right and into proper alignment with the railway tracks without moving the vehicle, it is simply necessary to supply fluid to cylinder 25a through conduit 27 and simultaneously to withdraw fluid from cylinder 25a through conduit 28. This action causes the piston and associated piston rod 25b to move toward the right relative to cylinder 25a and thus imparts a force to the axle 10 which is toward the right and which moves the axle 10 and wheels 8 and 9 toward the right. Simultaneously hydraulic fluid is supplied to cylinder 31a through conduit 34 and fluid is withdrawn from cylinder 31a through conduit 33 to allow the piston rod 31b to move inwardly and toward the right relative to cylinder 31a and such movement imparts a sidewise force to pivot 32 and to axle 10 through support 27 which cooperates with the force applied by piston rod 25b and in cooperative fashion to align the wheels 8 and 9 with the tracks 11 and 12 as shown in FIG. 4.

In like fashion, if the initial position of wheels 8 and 9 is to the right of tracks 11 and 12 as shown in FIG. 3, the manual operating levers 30 and 35 are appropriately manipulated so as to move the axle 10 and wheels 8 and 9 toward the left to occupy a proper position atop the tracks 11 and 12 as shown in FIG. 4.

Figure 6:
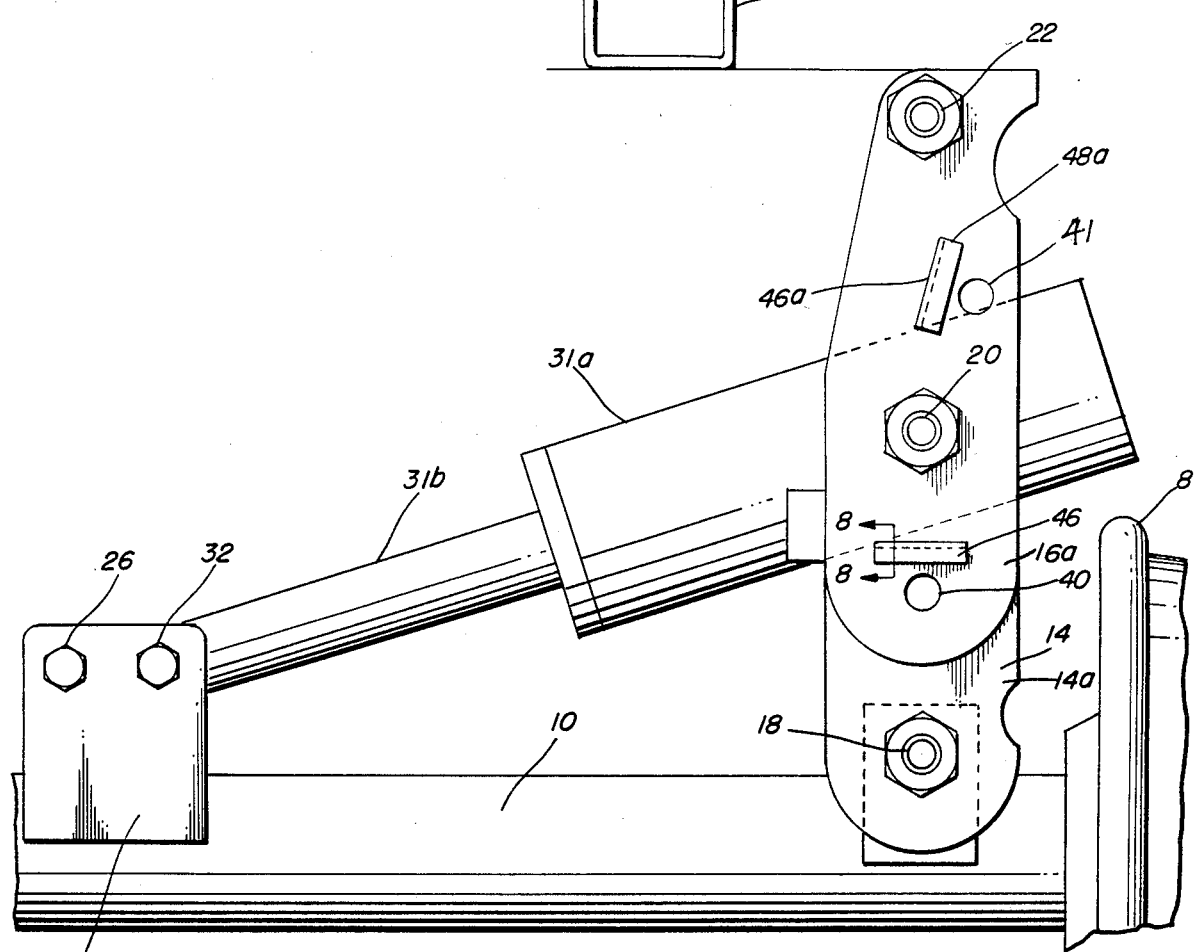
FIG. 6 shows the apparatus in its lowered or extended position.
Figure 7:
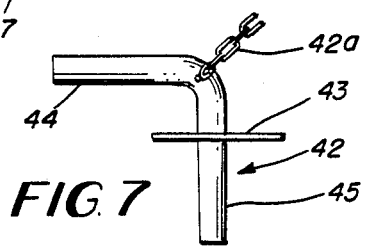
FIG. 7 shows a locking pin provided according to a feature of the invention.
Figure 8:
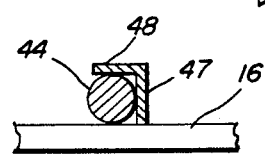
FIG. 8 is an enlarged cross sectional view taken on the line designated 8—8 in FIG. 6.

For the purpose of mechanically securing the toggle structures such as 14 and 16 in their extended position as shown in FIG. 6, mechanical interlocking means is provided and includes a locking aperture 40 formed in at least one link comprising the toggle structure such as 16 which when disposed in the extended or lowered position as shown in FIG. 6, coincides with an aperture not shown formed in one of the links such as 14a forming a part of toggle structure 14. Into these coinciding apertures, a locking element 42, best shown in FIG. 7, is inserted so as to secure these parts against relative movement. The locking element, as shown in FIG. 7, includes a chain 42a for retaining the locking element when disposed in unlocked condition, the chain being secured to an associated toggle structure, and a flange 43 together with a transverse extension 44 and a locking portion 45. Thus with the locking portion 45 inserted into the coincidental apertures 40 and the associated aperture in 14a which is not shown the flange 43 limits the inward travel of locking portion 45.

In order to prevent inadvertent dislodgment of the locking pin 42 from the coincident apertures, a holding ledge 46 is secured to the link such as 16a, the leg 47 of device 46 being welded to the link 16a and the ledge portion 48 extending toward the aperture 40. Thus with the locking pin 45 properly inserted so that the flange 43 engages the link 16a, the transverse extension 44 of locking pin 42 is swung underneath the ledge portion 48 of the ledge 46 so as to prevent outward dislodgment of the locking pin 42.

When the mechanism is operated to its retracted or upper position, the locking aperture 41 formed in link 16a swings into coincidence with the locking aperture not shown but which is formed in link 14a. Thereafter a locking pin, such as 42 is inserted through the coincidental locking apertures to secure the parts in their elevated positions and the transverse extension 44 of locking pin 42 is swung underneath the holding ledge 48a of the holding device 46a which is secured to link 16a adjacent the locking aperture 41.

An abutment element 50 is fixedly mounted on a part of two of said toggle structures and engages a part of the other associated toggle structure for arresting relative movement thereof at the approximate limit of extended movement of the toggle structures.

INDUSTRIAL APPLICABILITY

Railway wheel apparatus for a road vehicle formed according to this invention is particulalry advantageous because it provides for lowering flanged wheels vertically rather than through an outwardly swinging arc and thus avoids interference with other objects and conserves space underneath the vehicle body. The invention also is especially adapted to provide for lateral shifting of the flanged wheels and the associated axle relative to the road vehicle whereby precise alignment of the road vehicle wheels with the railway tracks is not necessary, thereby greatly facilitating easy transition from roadway service to service on railway tracks.

I claim:

1. Railway wheel apparatus for a road vehicle having a frame, said apparatus comprising an axle, a pair of flanged wheels mounted in spaced relation on said axle, a first pair of spaced apart toggle structure pivotally connected at one end thereof to said axle, a second pair of spaced apart toggle structures pivotally connected at one end thereof respectively to the other ends of said first pair of toggle structures and pivotally connected at the other ends thereof to said frame to form a pair of toggles interrelating said axle and said frame whereby extension of said first and said second toggle structures effects a downward lowering of said axle and said wheels and retraction of said first and said second toggle structure effects an upward raising of said axle and said wheels, and operating means for extending and retracting said toggles, said operating means being controlled by manually operable control means and arranged simultaneously to extend and to retract said toggles and also being adapted to extend either of said toggles while simultaneously retracting the other toggle.

2. Railway wheel apparatus according to claim 1 wherein said first and said second toggle structures swing in a plane which is in substantial alignment with said axle.

3. Railway wheel apparatus according to claim 1 wherein said first and said second pairs of toggle structures each comprises a pair of spaced substantially coincident toggle links.

4. Railway wheel apparatus according to claim 1 wherein said operating means comprises a pair of fluid motors pivotally connected with said axle intermediate said wheels and respectively pivotally connected with said first and said second pair of toggle structures.

5. Railway wheel apparatus according to claim 4 wherein each of said fluid motors is pivotally connected with the associated first and second toggle structure at the pivotal connection therebetween.

6. Railway wheel apparatus according to claim 1 wherein mechanical interlock means is arranged to secure each of said first toggle structures in fixed positional relation to the associated one of said second toggle structures so as to hold said toggle structures in their extended or retracted positions.

7. Railway wheel apparatus according to claim 6 wherein coincident locking apertures formed respectively in parts of each of said first and of said second toggle structures are arranged to receive a locking pin so as to prevent relative motion therebetween.

8. Railway wheel apparatus according to claim 7 wherein a single locking aperture is formed in a part of each of said first toggle structures and wherein a pair of locking apertures are formed in a part of each of said second toggle structures, one of each of said pair of locking apertures being disposed in coincidental relation with said single locking aperture when said toggle structures are in extended positions, and the other of each of said pair of locking apertures being disposed in coincidental relation with said single locking aperture when said toggle structures are in retracted positions, and locking pins arranged for respective insertion into coincidental apertures in extended and retracted positions of said toggle structures.

9. Railway wheel apparatus according to claim 8 wherein each of said locking pins includes a transverse extension and wherein a holding ledge is fixedly mounted on each of said second toggle structures adjacent each one of said pair of locking apertures for receiving the associated transverse extension thereby to secure the associated locking pin in locking position.

10. Railway wheel apparatus according to claim 1 wherein an abutment element is fixedly mounted on a part of two of said toggle structures and disposed for engagement with a part of the other associated toggle structure for arresting relative movement of said toggle structures at the approximate limit of extended movement of said toggle structures.

* * * * *